United States Patent
Richardson et al.

(10) Patent No.: US 6,624,259 B1
(45) Date of Patent: Sep. 23, 2003

(54) POWDER COATING OF POLYEPOXIDE OR β-HYDROXYALKYLAMIDE, ACID RESIN, POLYCARBOXYLIC ACID AND 3° OR 4° NITROGEN SOURCE

(75) Inventors: Frank Barnett Richardson, Consett (GB); Peter Joseph Huby Watson, Jarrow (GB)

(73) Assignee: Thomas Swan & Co. Ltd., County Durham (GB)

( * ) Notice: Subject to any disclaimer, the term of this patent is extended or adjusted under 35 U.S.C. 154(b) by 0 days.

(21) Appl. No.: 09/889,753

(22) PCT Filed: Jan. 24, 2000

(86) PCT No.: PCT/GB00/00182
§ 371 (c)(1),
(2), (4) Date: Oct. 5, 2001

(87) PCT Pub. No.: WO00/43458
PCT Pub. Date: Jul. 27, 2000

(30) Foreign Application Priority Data

Jan. 22, 1999 (GB) ................................. 9901485

(51) Int. Cl.$^7$ ......................... C08L 63/00; C08L 63/06; C08L 67/02
(52) U.S. Cl. ...................................... 525/438; 525/444
(58) Field of Search ................................ 525/438, 444

(56) References Cited

U.S. PATENT DOCUMENTS 4,175,173 A * 11/1979 Bagga et al. ................. 528/97
5,506,334 A * 4/1996 Gras et al. .................. 528/288
2001/0009939 A1 * 7/2001 Laver et al. ................. 524/91

FOREIGN PATENT DOCUMENTS

| DE | 19630450 A1 | * | 1/1998 |
| EP | 0 194 904 | | 9/1986 |
| EP | 0 315 084 | | 5/1989 |
| EP | 0 561 102 A1 | | 9/1993 |
| JP | 56-163119 A | * | 12/1981 |
| WO | WO 92/21727 | | 12/1992 |

OTHER PUBLICATIONS

Xp002137280, Database WPI, Section Ch, Week 199402, Derwent Publications, Ltd., London, G.B.; Class A28, AN 1994–012527; and Abstract of JP 05 320537 A (Nippon Kayaku KK), Dec. 3, 1993.

* cited by examiner

Primary Examiner—Robert E. L. Sellers
(74) Attorney, Agent, or Firm—Hoffman & Baron, LLP

(57) ABSTRACT

A powdered coating composition comprises a thermosetting resin which consists of two components. The first component includes an acid reactive material comprising a polyepoxide or β-hydroxyalkylamide compound. The second component is an acid terminated resin which reacts with the first component. A curing agent including a polycarboxylic acid having a functionality of at least 3 and a source of tertiary or quanternary nitrogen is present to react with an excess of the first component, thereby curing thermosetting resin.

15 Claims, No Drawings

POWDER COATING OF POLYEPOXIDE OR β-HYDROXYALKYLAMIDE, ACID RESIN, POLYCARBOXYLIC ACID AND 3° OR 4° NITROGEN SOURCE

This application is the National Stage of International Application No. PCT/GB00/00182, filed on Jan. 24, 2000, which has priority based on British Patent Application No. 9901485.4, filed on Jan. 22, 1999.

This invention relates to powdered coating compositions and more particularly is concerned with such compositions which give rise to the formation of matt or semi-gloss coatings.

Powdered coating compositions comprising a cross-linkable thermosetting resin and a curing agent therefor are well known. In use the powdered compositions are applied to the surface to be coated by, for example, dipping the article in a fluidised bed of the composition or by spraying the composition, preferably electrostatically, onto the surface of the article. The thus applied coating is then thermally cured, for example in an oven, at a temperature of, for example, from 150 to 210° C. to fuse and cross-link the composition to form a smooth homogeneous coating on the article.

It is known to apply coatings in this way to articles which need to be resistant to weathering and other external environmental conditions. Examples of such articles are aluminium-doors and window frames, lawnmowers, and the external trim of automobiles. Environmentally resistant coatings of this type are well known and may be based on powdered coating compositions including a thermosetting resin composed of two components. Typically these components are an acid terminated resin and an acid reactive material. The acid terminated resin may be a polyester, for example a polyester resin based on a mixture of glycols esterified with a diacid such as adipic acid, terminated with a trifunctional acid such as trimellitic anhydride. The acid reactive material may be a polyepoxide, such as triglycidyl isocyanurate or a β-hydroxyalkylamide. Examples of such thermosetting resins are a polyepoxide compound or resin cured with an acid terminated resin, a β-hydroxyalkylamide cross-linked with an acid terminated resin, or a hydroxyl terminated resin cured with a blocked isocyanate or etherified methylol resin.

Hitherto, such thermosetting resin components, have been fully reacted together, according to the stoichiometry, to form full gloss coatings. Typically, the ratios are from 90–96% polyester to 10–4% of the acid reactive material, depending upon the acid value of the polyester and the equivalent weight of the acid reactive material.

There is a need for powdered coating compositions which will give rise to exterior durable coatings exhibiting a uniform low gloss in the range of from 10 to 40% at an angle of 60°. Conventionally, it is known to produce matt coatings from solvent based coating compositions by incorporating, in the composition, finely divided solid fillers having a small mean particle size. However, it is difficult to incorporate such fillers, in the amounts required to produce efficient matting, in powdered coating compositions. Moreover, the incorporation of such fillers can result in loss of performance of the cured coating in, for example, terms of its impact resistance. Also, they can result in poor flow characteristics of the fused composition.

Alternatively, exterior durable matt coatings can be produced by dry blending powdered coating compositions having different reactivity. However, this procedure is not entirely satisfactory in practice because of manufacturing inconsistencies and gloss variation as a consequence of separation of the dry blended compositions.

It is an object of the present invention to provide a powdered coating composition which, after curing, will result in a coating film having an excellent appearance and a reduced gloss which can be adjusted in dependence upon the purpose of use of the coating by variation of the ratios of the components.

It is a further object of the present invention to provide a powdered coating composition which enables the production of homogeneous coatings which do not contain excessive quantities of filler.

These objects are overcome by using excess of the acid reactive material and reacting the excess with a curing agent, for the thermosetting resin, which comprises a polycarboxylic acid having a functionality of at least 3 and a source of tertiary or quaternary nitrogen.

Accordingly, the present invention provides a powdered coating composition comprising a thermosetting resin formed from:

(i) a first component which includes an acid reactive material comprising a polyepoxide or β-hydroxyalkylamide compound, and (ii) a second component comprising an acid terminated resin for reaction with the first component, the composition additionally including (iii) a curing agent for reaction with excess of said first component to cure the thermosetting resin, said curing agent including a polycarboxylic acid having a functionality of at least 3 and a source of tertiary or quaternary nitrogen.

The polycarboxylic acid may be a single compound or a mixture of such compounds. Similarly the tertiary or quaternary nitrogen source may be constituted by a single compound or by a blend of two or more tertiary or quaternary nitrogen compounds. The polycarboxylic acid on the one hand and the source of tertiary nitrogen on the other hand are separate entities.

The source of tertiary or quaternary nitrogen may be a tertiary amine or a quaternary ammonium compound. Tertiary amines are defined herein as compounds including a nitrogen atom covalently linked to three carbon atoms. Typical examples of suitable tertiary or quaternary nitrogen sources are cetyl trimethyl ammonium bromide; stearyl trimethyl ammonium bromide; distearyl methylamine; distearyl dimethyl ammonium bromide; lauryl amidopropyl-dimethylamine and mixtures of two or more thereof. Preferably the quaternary ammonium compound or tertiary amine has a melting point of ≧40° C. Typical examples of suitable polycarboxylic acids are trimellitic acid; pyromellitic acid; ethylene diamine tetracetic acid; tricarballylic acid; nitrilotriacetic acid, nitrilo diacetic monopropionic acid, butanetetracarboxylic acid, cyclopentanetetracarboxylic acid, citric acid, aconitic acid, trimesic acid, diethylene triamine penta acetic acid and mixtures of two or more thereof.

The relative proportions of the tertiary or quaternary nitrogen source and the polycarboxylic acid present in the curing agent may be varied as desired. Typically, the curing agent comprises a blend of from 2.5 to 30% w/w of tertiary or quaternary nitrogen source and from 70 to 97.5% w/w of polycarboxylic acid.

The curing agent may be admixed with the thermosetting resin, and other additives such as fillers and pigments, in an extruder with the extruded product being formed into a powder by, for example, grinding. The resultant powdered coating composition can then be coated onto an article, for example by. electrostatic spraying, and thermally cured to give a tough durable weatherproof coating on the article. The curing temperature may be in the range of from, for example, about 170 to about 220° C. and is preferably of the order of about 180 to 200° C. The coating is attractive and smooth and generally low gloss when thermally cured.

To matt the coating in accordance with the invention, the ratio of the components is varied from stoichiometric so as to liberate polyepoxide or β-hydroxylamide for reaction with the curing agent. The amount by which the ratio is varied depends upon the ratio in which the components would be used in order to obtain a full gloss coating. In the case where, for example, a polyester/triglycidyl isocyanurate ratio of 93/7 would be used to obtain a full gloss coating, variation of the ratio between 90/10 and 80/20, depending upon the gloss required, may be appropriate. The curing agent would typically be added at 50–150 parts per hundred parts of unreacted triglycidyl isocyanurate.

The level of gloss of the coating can be varied depending upon the nature and amounts of the ingredients forming the coating composition. Lower gloss is obtained by the use of lower levels of the acid terminated resin, thus increasing the amount of acid reactive material available for reaction with the curing agent. Higher gloss is obtained by using a higher level of the acid terminated resin, thus reducing the amount of acid reactive material available for reaction with the curing agent.

Particularly suitable polyepoxides are triglycidyl isocyanurate or a glycidyl ester such as the diglycidyl ester of terephthalic acid and/or the triglycidyl ester of trimellitic acid. Specific examples of suitable glycidyl esters are those commercially available under the designations Araldite PT810 and PT910.

The following Examples illustrate the invention.

EXAMPLE 1

A curing agent was made by blending 20 parts by weight of distearyl dimethyl ammonium bromide and 80 parts by weight of nitrilo triacetic acid. The individual ingredients were ground before blending to a maximum particle size of 75 μm.

EXAMPLE 2

A curing agent was made by blending 12.5 parts by weight of cetyl trimethyl ammonium bromide and 87.5 parts by weight of nitrilo triacetic acid. The individual ingredients were ground before blending to a maximum particle size of 75 μm.

EXAMPLE 3

A curing agent was made by blending 5 parts by weight of stearyl trimethyl ammonium bromide, 5 parts by weight of cetyl trimethyl ammonium bromide and 90 parts by weight of nitrilo triacetic acid. The individual ingredients were ground before blending to a maximum particle size of 75 μm

EXAMPLE 4

A curing agent was made by blending 10 parts by weight of cetyl trimethyl ammonium bromide, 45 parts by weight of nitrilo triacetic acid and 45 parts by weight of ethylene diamine tetra acetic acid. The individual ingredients were ground before blending to a maximum particle size of 75 μm.

EXAMPLE 5

A powder coating composition was made by blending 87.5 parts by weight of titanium dioxide pigment. (Tioxide RTC4); 28.3 parts by weight of Araldite PT810 polyepoxide; 113 parts by weight Crylcoat 2532 polyester; 18.8 parts by weight of the curing agent of Example 1; 0.5 parts by weight benzoin as degassing agent and 2.3 parts by weight of BYK 360P. This blended powder was melt compounded using a Prism TSE16 extruder and the extrudate was chilled, flaked and ground. The ground powder was sieved to a maximum particle size of 100 μm and spray applied on to bright mild steel test panels using an electrostatic spray gun set to 50–70 KV. The coated test panels were cured in a fan-circulated, electric laboratory-box oven for 15 minutes at 190° C. (time measured at metal temperature).

Araldite PT810 is a commercial triglycidyl isocyanurate of Ciba-Geigy derived from isocyanuric acid and epichlorhydrin and having an epoxy equivalent weight of 99 (theoretical); Crylcoat 2532 is an acid terminated polyester having an acid value of 20 (mg KOH/g) and available from UCB, Belgium; and BYK 360P is an acrylic flow control agent supplied by BYK-Chemie, Germany.

EXAMPLE 6

A powder coating composition was made by blending 87.5 parts by weight of Tioxide RTC4; 22.1 parts by weight of Araldite PT810; 125.2 parts by weight of Uralac 5201; 12.5 parts by weight of the curing agent of Example 2; 0.5 parts by weight of benzoin and 2.3 parts by weight of BYK 360P. This blended powder was melt compounded using a Prism TSE16 extruder and the extrudate was chilled, flaked and ground. The ground powder was sieved to a maximum particle size of 100 μm and spray applied to bright mild steel test panels using an electrostatic spray gun set to 50–70 KV. The coated test panels were cured in a fan-circulated, electric laboratory box oven for 15 minutes at 190° C. (time measured at metal temperature).

Uralac 5201 is .an acid terminated polyester having an acid value of 33 to 38 (mg KOH/g) obtainable from DSM Resins, Holland.

EXAMPLE 7

A powder coating composition was made by blending 87.5 parts by weight-of Tioxide RTC4; 22.1 parts by weight of Araldite PT810; 125.3 parts by weight of Crylcoat 2532; 12.5 parts by weight of the curing agent of Example 3; 0.5 parts by weight of benzoin and 2.3 parts by weight of BYK 360P. This blended powder was melt compounded using a Prism TSE16 extruder and the extrudate was chilled, flaked and ground. The ground powder was sieved to a maximum particle size of 100 μm and spray applied to bright mild steel test panels using an electrostatic spray gun set to 50–70 KV. The coated test panels were cured in a fan-circulated, electric laboratory box oven for 15 minutes at 190° C. (time measured at metal temperature).

EXAMPLE 8

A powder coating composition was made by blending 35 parts by weight of Tioxide RTC4; 22 parts by weight of Araldite PT810; 125.3 parts by weight of Uralac 5201; 12.5 parts by weight of the curing agent of Example 4; 0.5 parts by weight of benzoin and 2.3 parts by weight of BYK 360P. This blended powder was melt compounded using a Prism TSE16 extruder and the extrudate was chilled, flaked and ground. The ground powder was sieved to a maximum particle size of 100 μm and spray applied to bright mild steel test panels using an electrostatic spray gun set-to 50–70 KV. The coated test panels were cured in a fan-circulated, electric laboratory box oven for 15 minutes at 190° C. (time measured at metal temperature).

Specular gloss at 60° and 85° angle; reverse impact to ASTM D2794 and degree of yellowing (Db) relative to an unmodified, full gloss TGIC/polyester powder coating were determined for each of the coated test panels obtained in Examples 5 to 8. The results obtained are shown in the following Table.

EXAMPLE 9

A powder coating composition was made by blending 87.5 parts by weight of Tioxide RTC4; 22.1 parts by weight of Araldite PT910; 125.3 parts by weight of Crylcoat 803; 12.3 parts by weight of the curing agent of Example 2); 0.5 parts by weight of benzoin and 2.3 parts by weight of BYK 360P. This blended powder was melt compounded using a Prism TSE16 extruder and the extrudate was chilled, flaked and ground. The ground powder was sieved to a maximum particle size of 100 μm and spray applied to bright mild steel test panels using an electrostatic spray gun set to 50–70 KV. The coated test panels were cured in a fan-circulated, electric laboratory box oven for 15 minutes at 190° C. (time measured at metal temperature).

Araldite PT910 is commercial glycidyl ester from CIBA-Geigy and based on a mixture of glycidyl esters of terephthalic acid and trimellitic anhydride. It has an epoxy equivalent weight of about 150. Crylcoat 803 is an acid terminated polyester resin, mean acid value 25 from UCB Resins, Belgium.

EXAMPLE 10

A powder coating composition was made by blending 87.5 parts by weight of Tioxide RTC4; 111.7 parts by weight of Kukdo ST4000D; 35.6 parts by weight of Uralac 5201; 12.5 parts by weight of the curing agent of Example 2); 0.5 parts by weight of benzoin and 2.3 parts by weight of BYK 360P. This blended powder was melt compounded using a Prism TSE16 extruder and the extrudate was chilled, flaked and ground. The ground powder was sieved to a maximum particle size of 100 μm and spray applied to bright mild steel test panels using an electrostatic spray gun set to 50–70 KV. The coated test panels were cured in a fan-circulated, electric laboratory box oven for 15 minutes at 190° C. (time measured at metal temperature).

Kukdo ST4000D is an epoxy resin based on hydrogenated bisphenol A, mean epoxy equivalent weight 700, from Kukdo Chemical Industry Co., Korea.

TABLE

| | 60° Gloss | 85° Gloss | Reverse impact | Db |
|---|---|---|---|---|
| Example 5 | 23.2 | 25.8 | Pass 160 in lbs | 2.33 |
| Example 6 | 12.8 | 21.8 | Pass 160 in lbs | 1.94 |
| Example 7 | 20.9 | 37.2 | Pass 100 in lbs | 2.26 |
| Example 8 | 20.9 | 27.2 | Pass 100 in lbs | 4.49 |
| Example 9 | 21.0 | — | Pass 80 in lbs | 1.8 |
| Example 10 | 14.1 | — | Pass 80 in lbs | 2.35 |

What is claimed is:

1. A powdered coating composition comprising a thermosetting resin formed from:
   (i) a first component which includes an acid reactive material comprising a polyepoxide or β-hydroxyalkylamide compound, and
   (ii) a second component comprising an acid terminated resin for reaction with the first component, the composition additionally including
   (iii) a curing agent for reaction with excess of said first component to cure the thermosetting resin, said curing agent including a polycarboxylic acid having a functionality of at least 3 and a source of tertiary or quaternary nitrogen.

2. A powdered coating composition according to claim 1, wherein the polycarboxylic acid is a single compound.

3. A powdered coating composition according to claim 1, wherein the polycarboxylic acid is a mixture of such acids.

4. A powdered coating composition according to claim 1, wherein the tertiary nitrogen source is constituted by a single compound.

5. A powdered coating composition according to claim 1, wherein the tertiary nitrogen source is constituted by a blend of two or more tertiary or quaternary nitrogen compounds.

6. A powdered coating composition according to claim 1, wherein the source of tertiary or quaternary nitrogen is a tertiary amine.

7. A powdered coating composition according to claim 1, wherein the source of tertiary or quaternary nitrogen is a quaternary ammonium compound.

8. A powdered coating composition according to claim 1, wherein the tertiary or quaternary nitrogen source is cetyl trimethyl ammonium bromide; stearyl trimethyl ammonium bromide; distearyl methylamine; distearyl dimethyl ammonium bromide; lauryl amidopropyl-dimethylamine or mixtures of two or more thereof.

9. A powdered coating composition according to claim 1, wherein the source of tertiary or quaternary nitrogen is a quaternary ammonium compound or tertiary amine having a melting point of $\geq 40°$ C.

10. A powdered coating composition according to claim 1, wherein the polycarboxylic acid is trimellitic acid; pyromellitic acid; ethylene diamine tetracetic acid; tricarballylic acid; nitrilotriacetic acid, nitrilo diacetic monopropionic acid, butanetetracarboxylic acid, cyclopentanetetracarboxylic acid, citric acid, aconitic acid, trimesic acid, diethylene triamine penta acetic acid or mixtures of two or more thereof.

11. A powdered coating composition according to claim 1, wherein the curing agent comprises a blend of from 2.5 to 30% w/w of tertiary or quaternary nitrogen source and from 70 to 97.5% w/w of polycarboxylic acid.

12. A powdered coating composition according to claim 1, wherein the polyepoxide is triglycidyl isocyanurate.

13. A powdered coating composition according to claim 1, wherein the polyepoxide is the diglycidyl ester of terephthalic acid.

14. A powdered coating composition according to claim 1, wherein the polyepoxide is the triglycidyl ester of trimellitic acid.

15. A powdered coating composition according to claim 1, wherein the acid terminated resin is a polyester.

* * * * *